(12) United States Patent
Aoshima et al.

(10) Patent No.: US 11,621,106 B2
(45) Date of Patent: Apr. 4, 2023

(54) WATERPROOF CONNECTOR AND DEVICE WITH CONNECTOR

(71) Applicant: Yazaki Corporation, Tokyo (JP)

(72) Inventors: Kengo Aoshima, Kakegawa (JP); Takeo Ida, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/526,711

(22) Filed: Nov. 15, 2021

(65) Prior Publication Data

US 2022/0189661 A1 Jun. 16, 2022

(30) Foreign Application Priority Data

Dec. 16, 2020 (JP) .............................. JP2020-208285

(51) Int. Cl.
*H01B 17/30* (2006.01)
*H01B 17/58* (2006.01)

(52) U.S. Cl.
CPC ......... *H01B 17/301* (2013.01); *H01B 17/583* (2013.01)

(58) Field of Classification Search
CPC ............................ H01B 17/301; H01B 17/583; H01R 13/5202; H01R 13/5205; H02G 3/0616; H02G 15/013
See application file for complete search history.

(56) References Cited

U.S. PATENT DOCUMENTS

| | | | | | |
|---|---|---|---|---|---|
| 2,722,667 | A | * | 11/1955 | Huston | ................ H01R 13/627 439/372 |
| 4,611,872 | A | * | 9/1986 | Ito | ...................... H01R 13/5219 439/587 |
| 5,927,725 | A | * | 7/1999 | Tabata | ............... H01R 13/5205 174/152 G |
| 6,368,132 | B1 | * | 4/2002 | Okayasu | ............. H01R 13/533 439/275 |
| 7,229,325 | B1 | * | 6/2007 | Flynn | ..................... H01R 9/223 439/798 |

(Continued)

FOREIGN PATENT DOCUMENTS

EP 2 882 045 A1 6/2015
JP 62-127683 U 8/1987
(Continued)

*Primary Examiner* — William H. Mayo, III
*Assistant Examiner* — Rhadames Alonzo Miller
(74) *Attorney, Agent, or Firm* — Sughrue Mion, PLLC (57) ABSTRACT

A waterproof connector that is easy to design and manufacture and that can provide sufficiently close contact with respect to a through hole including a tapered opening is provided. A sealing member that provides waterproofness of the waterproof connector includes an inner tube portion and an outer tube portion, and the connector body includes a holding projection. The holding projection is configured to be inserted between the inner tube portion and the outer tube portion from a rear side in an insertion direction and configured to push the outer tube portion against an inner circumferential face of the tapered opening when the sealing member is received between the outer circumferential face of the connector body and the inner circumferential face of the tapered opening.

6 Claims, 3 Drawing Sheets

(56) References Cited

U.S. PATENT DOCUMENTS

| | | | | |
|---|---|---|---|---|
| 2002/0052141 A1* | 5/2002 | Hattori | H01R 13/5205 | 439/587 |
| 2002/0101041 A1* | 8/2002 | Kameyama | H01R 13/521 | 277/628 |
| 2003/0121691 A1* | 7/2003 | Inoue | F16L 37/0987 | 174/650 |
| 2003/0184088 A1* | 10/2003 | Takayanagi | F16L 37/0987 | 285/319 |
| 2003/0184089 A1* | 10/2003 | Takayanagi | F16L 37/0987 | 285/319 |
| 2004/0061332 A1* | 4/2004 | Takayanagi | F16L 37/0847 | 285/330 |
| 2004/0066034 A1* | 4/2004 | Takayanagi | F16L 3/1226 | 285/319 |
| 2004/0266270 A1* | 12/2004 | Miyazaki | H01R 4/46 | 439/660 |
| 2007/0207668 A1* | 9/2007 | Masuzaki | G02B 6/3891 | 439/587 |
| 2008/0014793 A1* | 1/2008 | Okumura | H01R 13/5216 | 439/587 |
| 2009/0176416 A1* | 7/2009 | Flynn | H01R 13/5216 | 439/798 |
| 2012/0149243 A1* | 6/2012 | Ohnishi | H01R 43/24 | 29/883 |
| 2012/0156927 A1* | 6/2012 | Shiga | H01R 13/5208 | 439/521 |
| 2014/0099810 A1* | 4/2014 | Scott | H01R 43/26 | 439/183 |
| 2014/0335739 A1* | 11/2014 | Sato | H01R 13/641 | 439/680 |
| 2015/0140851 A1* | 5/2015 | Wang | H01R 13/5221 | 439/275 |
| 2015/0303592 A1* | 10/2015 | Tait | H01R 4/26 | 439/391 |
| 2016/0236125 A1* | 8/2016 | Umeno | H05K 5/0213 | |
| 2017/0149170 A1* | 5/2017 | Tait | H01R 13/506 | |
| 2018/0048108 A1* | 2/2018 | Takahashi | H01R 13/6463 | |
| 2020/0194930 A1* | 6/2020 | Yamada | H01R 13/6215 | |
| 2020/0224767 A1* | 7/2020 | Chikamatsu | F16J 15/3236 | |
| 2020/0254944 A1* | 8/2020 | Hashimoto | B60R 16/0207 | |
| 2022/0035102 A1* | 2/2022 | Zhu | G02B 6/3894 | |

FOREIGN PATENT DOCUMENTS

| | | |
|---|---|---|
| JP | 9-92385 A | 4/1997 |
| JP | 2020-113418 A | 7/2020 |

* cited by examiner

WATERPROOF CONNECTOR AND DEVICE WITH CONNECTOR

TECHNICAL FIELD

The present invention relates to a waterproof connector that is configured to be attached to a through hole provided in an outer wall of a device to provide waterproofness, and relates to a device with connector.

BACKGROUND

Conventionally, a connector of a type that is directly attached to a device is known, in which the connector is attached to a through hole provided on an outer wall of a device. This type of connector is partially inserted into the through hole and attached thereto. This configuration has a drawback that water may enter between the connector and an inner circumferential face of the through hole, thus some kind of waterproofing measure is often taken.

Some of the through holes of the device for the attachment of the connector are provided with a tapered opening, the tapered opening being an opening portion located on an outer side of the device and having an opening diameter that is larger on the outer side of the device than on an inner side of the device so the opening diameter decreases toward the inner side of the device. This tapered opening serves as a guide for insertion when inserting the connector into the through hole, thereby improving workability for connector attachment. On the other hand, from the viewpoint of waterproofness, an attention must be given to that a space between the outer circumferential face of the connector and the inner circumferential face of the tapered opening tends to be large.

Thus, noting that there may be a space between the outer circumferential face of the connector body and the inner circumferential face of the tapered opening, there have been proposed a waterproof connector having a sealing member disposed at this space to seal the space between them (for example, refer to Patent Document 1). In the waterproof connector described in Patent Document 1, the sealing member has a double-tube shape including an outer tube portion and an inner tube portion, in which the inner tube portion is in close contact with the outer circumferential face of the connector body, and the outer tube portion is in close contact with the inner circumferential face of the tapered opening to ensure waterproofness.

PRIOR ART DOCUMENT

Patent Document 1: JP 2020-113418 A

SUMMARY OF THE INVENTION

Problem to be Solved by the Invention

In general, the sealing member provided to the waterproof connector is made of a flexible material such as rubber. Thus, in order to provide the sealing member a double-tube shape as described above to obtain sufficiently close contact between the connector body and the tapered opening, it is necessary to design and manufacture with a careful consideration of a thickness and a shape and such of the tubes in view of the deformation and crushing of each tube. Such consideration may cause a difficulty in design and manufacture of the waterproof connector depending on the shape and size of the connector body and/or the tapered opening.

Therefore, in view of the above-described drawback, an object of the present invention is to provide a waterproof connector and a device with connector which are easy to design and manufacture and which can obtain sufficiently close contact with a through hole with a tapered opening.

Solution to the Problem

In order to achieve the above-described object, a waterproof connector according to the present invention includes a connector body configured to be attached to a through hole by inserting a part of the connector body into the through hole, the through hole penetrating through an outer wall of a device and including a tapered opening, the tapered opening being an opening portion on an outer side of the device, an opening diameter of the opening portion being larger on the outer side of the device than on an inner side of the device such that the opening diameter decreases toward the inner side of the device, and a sealing member having a ring shape and having a flexibility, the sealing member being configured to seal a space between an outer circumferential face of the connector body and an inner circumferential face of the tapered opening to provide waterproofness with respect to the through hole. The sealing member includes a tube-shaped inner tube portion configured to closely contact with the outer circumferential face of the connector body, and an outer tube portion which surrounds the inner tube portion in a circumferential direction on a rear side in an insertion direction in which the outer tube portion is inserted into the tapered opening, which has an opening diameter larger than the inner tube portion, and which is formed integral with the inner tube portion on a front side in the insertion direction. The connector body includes a holding projection. The holding projection is configured to be inserted between the inner tube portion and the outer tube portion from the rear side in the insertion direction and configured to push the outer tube portion against the inner circumferential face of the tapered opening when the sealing member is received between the outer circumferential face of the connector body and the inner circumferential face of the tapered opening.

Further, in order to achieve the above-described object, a device with connector according to the present invention includes a device including a through hole formed on an outer wall of the device, the through hole penetrating through the outer wall of the device and including a tapered opening, the tapered opening being an opening portion facing an outer side of the device that has an opening diameter larger on the outer side of the device than on an inner side of the device such that the opening diameter decreases toward the inner side of the device, and the waterproof connector as described above, a part of which is inserted and attached to the through hole and which provides waterproofness with respect to the through hole.

Advantageous Effect of the Invention

According to the waterproof connector and the device with connector of the present invention, the inner tube portion of the sealing member is pushed against the outer circumferential face of the connector body, and the outer tube portion of the sealing member is pushed against the inner circumferential face of the tapered opening of the through hole. These pushing secure a sufficiently close contact between the inner tube portion and the outer circumferential face of the connector body and a sufficiently close contact between the outer tube portion and the inner circumferential face of the tapered opening. The above-described pushing in each tube portion of the sealing member can be obtained regardless of the flexibility of the sealing member by inserting the holding projection of the connector body between the inner tube portion and the outer tube portion of the sealing member. This function of the holding projection can make each tube portion of the sealing member in sufficiently close contact with the outer circumferential face of the connector body and with the inner circumferential face of the tapered opening without the need for strict consideration of the thickness, shape, and the like of each tube portion of the sealing member during its design or manufacture. Thus, the waterproof connector and the device with connector as described above are easy to design and manufacture and can obtain sufficiently close contact with respect to the through hole with the tapered opening.

DETAILED DESCRIPTION OF THE EXEMPLARY EMBODIMENTS

In the following, an embodiment of a waterproof connector and a device with connector will be described.

Figure 1:
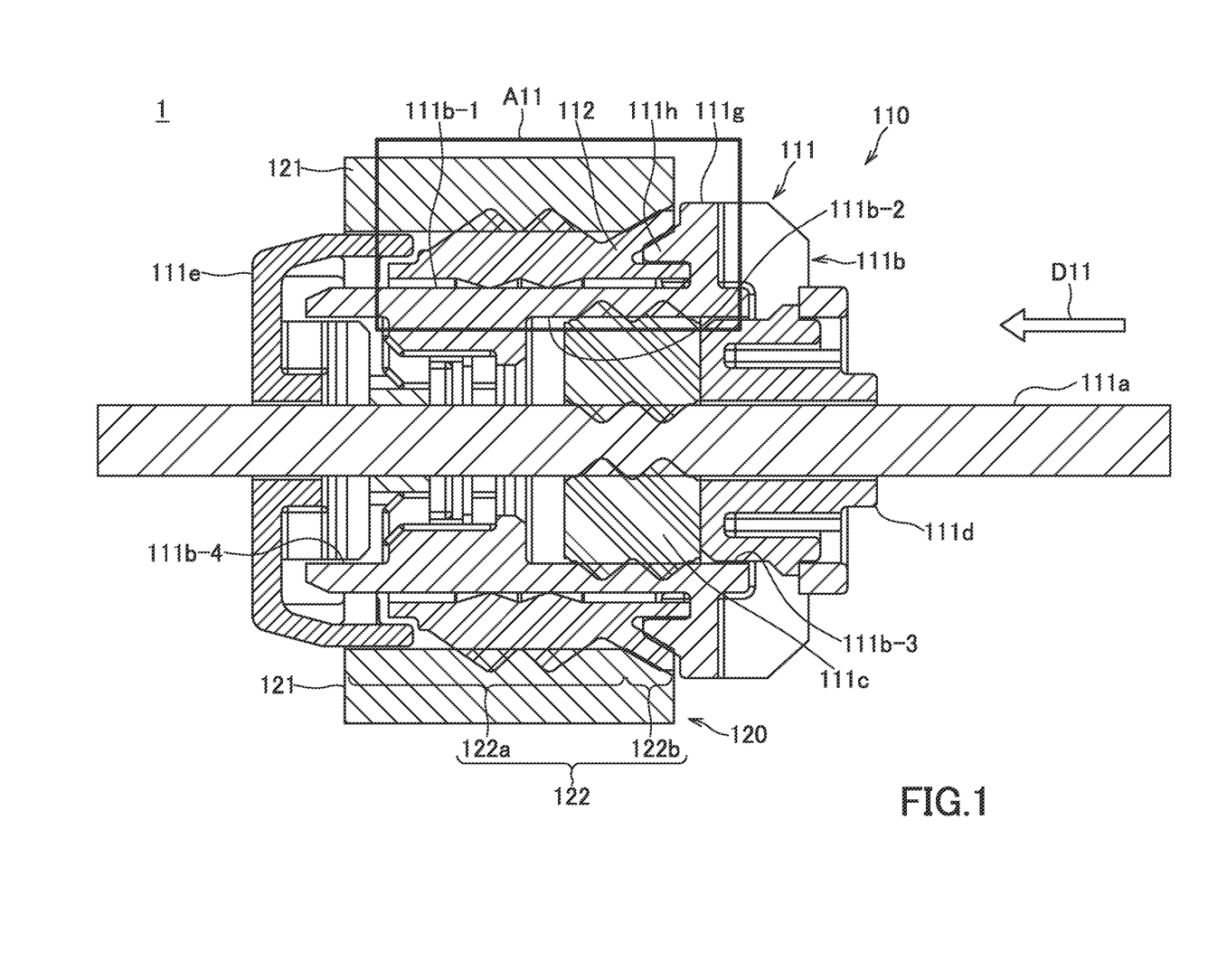
FIG. 1 is a schematic diagram showing a device with connector according to one embodiment.

FIG. 1 is a schematic diagram showing a device with connector according to one embodiment. In FIG. 1, a device with connector 1 is shown in a schematic cross-sectional view of a waterproof connector 110 and an outer wall 121 of a device 120 in the vicinity of an attachment portion for the waterproof connector 110.

The device 120 includes a through hole 122 formed on the outer wall 121 as the attachment portion for the waterproof connector 110. The through hole 122 includes a tapered opening 122b as an opening portion having a cylindrical-hole shape that is provided on an end of a hole body 122a on the outer side of the device. The tapered opening 122b has a mortar-shaped opening, an opening diameter of which is larger on the outer side of the device than on an inner side of the device such that the opening diameter decreases toward the inner side of the device.

The waterproof connector 110 is configured to be attached to the through hole 122 of the device 120 by inserting a part of the waterproof connector 110 into the through hole 122 in an insertion direction D11 shown in the drawing, and the waterproof connector 110 is waterproofed with respect to the through hole 122. The waterproof connector 110 includes a connector body 111 and a sealing member 112.

First, the connector body 111 will be explained.

The connector body 111 is attached to the through hole 122 of the device 120 by inserting a part of the connector body 111 into the through hole 122 in the insertion direction D11 shown in the drawing. The connector body 111 includes an electric wire 111a including an end to be connected to a terminal (not shown), a housing 111b, an inner sealing member 111c, a rear holder 111d and a front holder 111e.

The electric wire 111a is passed through the device 120 in a state where the electric wire 111a is being held by the housing 111b, and the end of the electric wire 111a is connected to the terminal.

The housing 111b, the inner sealing member 111c, the rear holder 111d and the front holder 111e are all made of resin and are formed in a substantially cylindrical shape. The housing 111b is positioned so as to be passed through the through hole 122 of the device 120 and holds the electric wire 111a via the inner sealing member 111c. The housing 111b is provided with a flange portion 111g that is disposed on a rear side in the insertion direction D11 of an outer circumferential face 111b-1 of the housing 111b and that protrudes in a ring shape to cover an edge of the tapered opening 122b. The inner sealing member 111c is formed in a cylindrical shape from a flexible resin such as rubber and is sandwiched between an inner circumferential face 111b-2 of the housing 111b and an outer circumferential face of the electric wire 111a to seal a space between them. Two rows of lip rings are disposed on each of the outer circumferential face and the inner circumferential face of the inner sealing member 111c, and the lip rings are configured to closely contact with the inner circumferential face 111b-2 of the housing 111b and with the outer circumferential face of the electric wire 111a with the lip rings in a crushed state. With the electric wire 111a penetrating through the rear holder 111d, the rear holder 111d is mounted to close an opening 111b-3 of the housing 111b located on the outer side of the device while pushing the inner sealing member 111c into the housing 111b. With the electric wire 111a penetrating through the front holder 111e, the front holder 111e is mounted to close an opening 111b-4 of the housing 111b located at an inner side of the device.

The connector body 111 described above is attached to the through hole 122 formed on the outer wall 121 of the device 120 such that, with respect to the insertion direction D11, an end of the front holder 111e is inserted in the device so as to slightly protrude into the device. The sealing member 112 provides waterproofness between the connector body 111 and the through hole 122.

Figure 2:
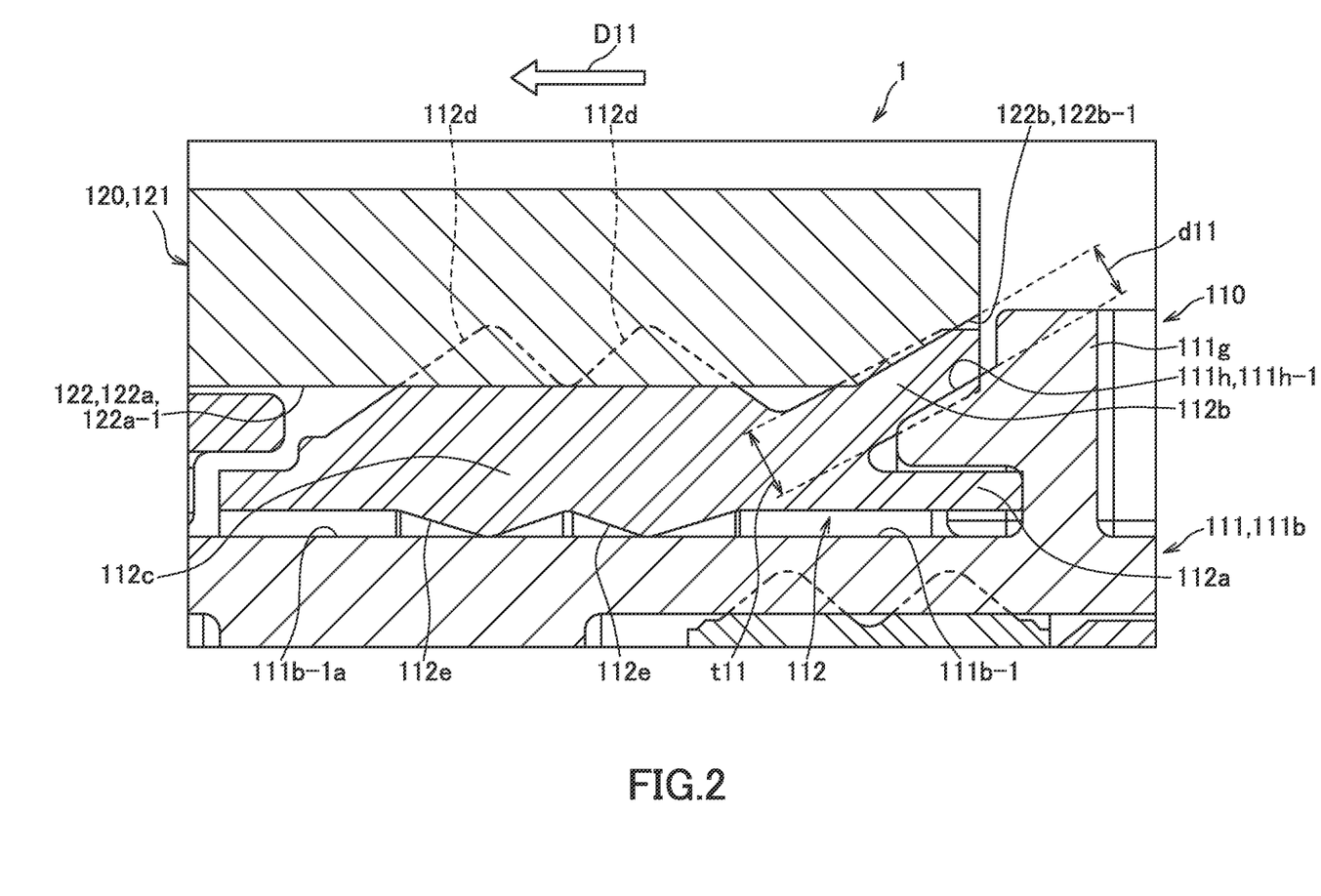
FIG. 2 is an enlarged view of a region A11 in FIG. 1, illustrating a sealing member shown in FIG. 1.
Figure 3:
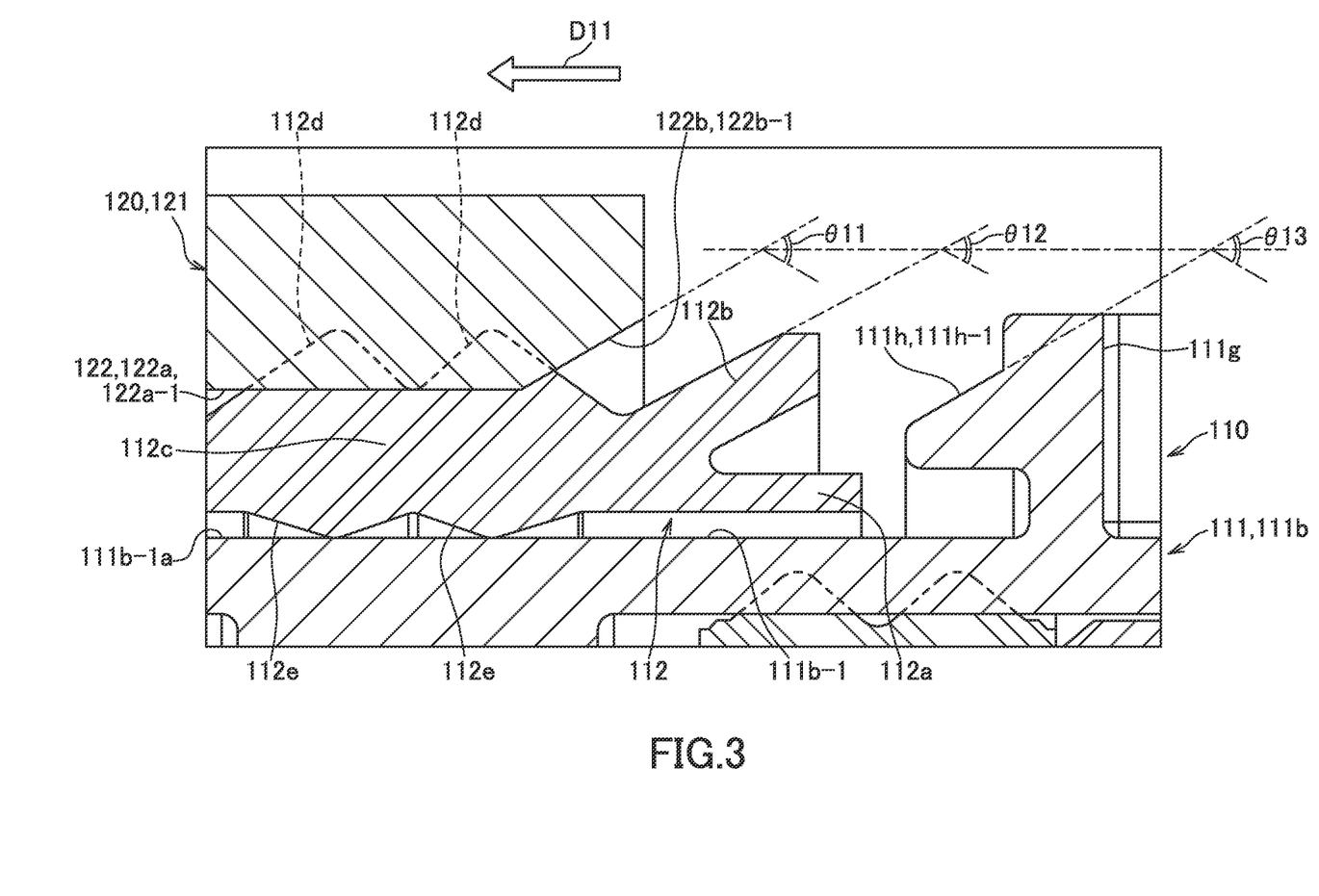
FIG. 3 is an exploded view of a part shown in the enlarged view of FIG. 2, exploded with respect to an insertion direction.

FIG. 2 is an enlarged view of a region A11 in FIG. 1, illustrating the sealing member shown in FIG. 1. FIG. 3 is an exploded view of a part shown in the enlarged view of FIG. 2, exploded with respect to the insertion direction.

The sealing member 112 is a member configured to provide waterproofness against the through hole 122 by sealing a space between the outer circumferential face of the connector body 111, particularly the outer circumferential face 111b-1 of the housing 111b, and the inner circumferential face of the through hole 122 provided on the outer wall 121 of the device 120. The sealing member 112 is made of a resin having flexibility such as rubber and is formed in a cylindrical shape.

The sealing member 112 includes an inner tube portion 112a, an outer tube portion 112b and a front sealing portion 112c. A double-tube portion constituted of the inner tube portion 112a and the outer tube portion 112b seals a space between the outer circumferential face 111b-1 of the housing 111b and the inner circumferential face 122b-1 of the tapered opening 122b of the through hole 122. The front sealing portion 112c seals a space between the outer circumferential face 111b-1 of the housing 111b and the inner circumferential face of the hole body 122a of the through hole 122.

The inner tube portion 112a is a tube-shaped section which is in close contact with the outer circumferential face 111b-1 of the housing 111b, i.e., the outer circumferential face of the connector body 111. The outer tube portion 112b is formed in a tapered-tube shape such that it surrounds the inner tube portion 112a in the circumferential direction on the rear side in the insertion direction D11 into the tapered opening 122b, and an opening diameter of the outer tube portion 112b is larger than an opening diameter of the inner tube portion 112a. The outer tube portion 112b is formed integral with the inner tube portion 112a on the front side in the insertion direction D11.

In this embodiment, the housing 111b, i.e., the connector body 111, is provided with a holding projection 111h for holding the double-tube portion of the sealing member 112. The holding projection 111h is configured to be inserted between the inner tube portion 112a and the outer tube portion 112b from the rear side in the insertion direction D11. When the double-tube portion of the sealing member 112 is received between the outer circumferential face 111b-1 of the housing 111b and the inner circumferential face 122b-1 of the tapered opening 122b, the holding projection 111h functions as follows. That is, the holding projection 111h pushes the outer tube portion 112b against the inner circumferential face 122b-1 of the tapered opening 122b. The holding projection 111h is a ring-shaped section that is formed integral with the flange portion 111g so as to project from the ring-shaped flange portion 111g of the housing 111b to the insertion direction D11 into the through hole 122.

In this embodiment, the rear side in the insertion direction D11 of the sealing member 112 is held by the holding projection 111h of the housing 111, and the front side in the insertion direction D11 of the sealing member 112 is held by the front holder 111e shown in FIG. 1.

The outer tube portion 112b of the sealing member 112 has a tapered tube-shape extending in the insertion direction D11 with its opening diameter decreased in the insertion direction D11 at a taper angle θ12 smaller than a taper angle θ11 of the tapered opening 122b of the through hole 122. Further, a tapered face 111h-1 of the holding projection 111h corresponds to a face of the holding projection 111h that faces the inner circumferential face 122b-1 of the tapered opening 122b via the outer tube portion 112b sandwiched therebetween as described below. That is, said face of the holding projection 111h is the tapered face 111h-1 extending in the insertion direction D11 with its opening diameter decreased in the insertion direction D11 at a taper angle θ13 larger than a taper angle θ12 of the outer tube portion 112b. In this embodiment, the taper angle θ 13 of the tapered face 111h-1 of the holding projection 111h is substantially equal to the taper angle θ11 of the tapered opening 122b. The outer tube portion 112b of the sealing member 112 is formed with a thickness dimension t11 that is larger than a gap d11 between the inner circumferential face 122b-1 of the tapered opening 122b and the tapered face 111h-1 of the holding projection 111h.

The sealing member 112 includes the front sealing portion 112c that extends from a joint portion of the inner tube portion 112a and the outer tube portion 112a to a space between a front-side outer circumferential face 111b-1a of the housing 111b and a front-side inner circumferential face 122a-1 of the through hole 122 to seal the space therebetween. The front-side outer circumferential face 111b-1a of the housing 111b is a face portion located on the outer circumferential face 111b-1 of the housing 111b and on the front side in the insertion direction D11 with respect to the tapered opening 122b. The front-side inner circumferential face 122a-1 of the through hole 122 is an inner circumferential face of the hole body 122a of the through hole 122 that is located on the front side in the insertion direction D11 with respect to the tapered opening 122b.

Further, the outer circumferential face of the front sealing portion 112c of the sealing member 112 is provided with two rows of outer circumferential lip rings 112d protruding in a ring shape toward the front-side inner circumferential face 122 a-1 of the through hole 122. Further, the inner circumferential face of the front sealing portion 112c is provided with two rows of inner circumferential lip rings 112e protruding in a ring shape toward the outer circumferential face 111b-1 of the housing 111b.

According to the waterproof connector 110 and the device with connector 1 described above, the inner tube portion 112a of the sealing member 112 is pushed against the outer circumferential face 111b-1 of the connector body 111, and the outer tube portion 112b of the sealing member 112 is pushed against the inner circumferential face 122b-1 of the tapered opening 122b of the through hole 122. These pushing secures a sufficiently close contact between the inner tube portion 112a and the outer circumferential face 111b-1 of the connector body 111 and secures a sufficiently close contact between the outer tube portion 112b and the inner circumferential face 122b-1 of the tapered opening 122b. The above-described pushing in each tube portion of the sealing member 112 can be obtained regardless of the flexibility of the sealing member 112, by inserting the holding projection 111h of the housing 111b between the inner tube portion 112a and the outer tube portion 112b of the sealing member 112. The close contact between each tube portion and the mating portion achieved by the function of the holding projection 111h can be obtained without a strict consideration of the thickness, shape, and the like of each tube portion of the sealing member 112 during design or manufacture. Thus, the waterproof connector as described above is easy to design and manufacture and can obtain sufficiently close contact with respect to the through hole 122 including the tapered opening 122b.

In this embodiment, the flange portion 111g is provided at the housing 111b of the connector body 111, and the holding projection 111h is formed integral with the flange portion 111g. According to this configuration, the holding projection 111h can be inserted between the inner tube portion 112a and the outer tube portion 112b of the sealing member 112 just by an operation of attaching the sealing member 112 to the housing 111b. That is, according to the above-described configuration, there is no need for a special configuration or a separate operation for inserting the holding projection 111h between the inner tube portion 112a and the outer tube portion 112b, the assembly procedure of the waterproof connector 110 can be simplified.

Further, in this embodiment, the taper angle θ12 of the outer tube portion 112b is smaller than the taper angle θ11 of the tapered opening 122b. In addition, the face of the holding projection 111h which faces the inner circumferential face 122b-1 of the tapered opening 122b via the outer tube portion 112b sandwiched therebetween is the tapered face 111h-1 having the taper angle θ13 larger than the taper angle θ12 of the outer tube portion 112b. According to these configurations, it is possible to make the outer tube portion 112b to be in sufficiently close contact not only with the inner circumferential face 122b-1 of the tapered opening 122b but also with the tapered face 111h-1 of the holding projection 111h.

Further, in this embodiment, the outer tube portion 112b is formed to have the thickness dimension t11 that is larger than the gap d11 between the inner circumferential face 122b of the tapered opening 122b and the tapered face 111h-1 of the holding projection 111h. According to this configuration, the outer tube portion 112b having the above-described large thickness dimension t11 is sandwiched between the inner circumferential face 122b-1 of the tapered opening 122b and the holding projection 111h. This sandwiching of the outer tube portion 112b can further secure sufficiently close contact between each of the inner circumferential face 122b-1 of the tapered opening 122b, the holding projection 111h and the outer tube portion 112b.

In addition, in this embodiment, the sealing member 112 further includes the front sealing portion 112c that seals the space between the front-side outer circumferential face 111b-1a of the housing 111b and the front-side inner circumferential face 122 a-1 of the through hole 122. According to this configuration, waterproofness between the housing 111b and a part of the through hole 122 on the inner side with respect to the tapered opening 122b is achieved by the front sealing portion 112c provided to the sealing member 112. Thus, according to the above configuration, the waterproof between the housing 111b and the through hole 122 can be achieved with one sealing member 112 over the portion on the inner side with respect to the tapered opening 122b of the through hole 122, thereby reducing the number of components.

In this embodiment, the outer circumferential lip rings 112d are provided on the outer circumferential face of the front sealing portion 112c of the sealing member 112, and the inner circumferential lip rings 112e are provided on the inner circumferential face of the front sealing portion 112c. According to this configuration, a friction sliding area where friction sliding against the outer circumferential face 111b-1 occurs during the attachment of the sealing member 112 to the housing 111b can be reduced, and a friction sliding area where friction sliding against the inner circumferential face 122a occurs during the insertion of the waterproof connector 110 into the through hole 122 can be reduced. The reduction in the friction sliding areas can reduce attachment friction during the attachment of the sealing member 112 on the outer circumferential face of the housing 111b and can reduce insertion friction during the insertion of the waterproof connector 110 into the through hole 122 while securing the above-described sufficiently close contact.

It should be noted that the embodiment described above are merely illustrative of the present invention, and the present invention is not limited thereto. In other words, various modifications can be made without departing from the gist of the present invention. As long as such modifications provides a configuration of the waterproof connector and the device with connector of the present invention, such modifications are within the scope of the present invention.

For example, in the above-described embodiment, the connector body 111 an internal structure of which is illustrated is shown as an example of a connector body. However, the connector body may include any internal structure as long as a part thereof is inserted into and attached to a through hole provided with a tapered opening.

In the above-described embodiment, as an example of the holding projection, the holding projection 111h that is formed integral with the flange portion 111g provided at the housing 111b is shown. However, the holding projection is not limited thereto, and it may be a separate component which is formed and attached separately from the housing and the flange portion. However, as described above, the assembly procedure of the waterproof connector 110 can be simplified by employing the holding projection 111h formed integral with the flange portion 111g of the housing 111b.

Further, in the above-described embodiment, as an example of the outer tube portion of the sealing member, the outer tube portion 112b having the taper angle θ12 smaller than the taper angle θ11 of the tapered opening 122b is shown. Further, as an example of the holding projection, the holding projection 111h in which the face of the tapered opening 122b facing the inner circumferential face 122b-1 with the outer tube portion 112b sandwiched therebetween has the tapered face 111h-1 having the taper angle θ13 larger than the taper angle θ12 of the outer tube portion 112b is shown. However, the outer tube portion and the holding projection are not limited thereto, and they may not be in the tapered shape having the taper angles θ12, θ13 with the above-described magnitude relationship including the taper angle θ11 of the tapered opening 122b. The outer tube portion and the holding projection may be configured such that the taper angles θ11, θ12, θ13 as described above have the tapered shape equal to each other, or may be in the shape other than the tapered shape such as a cylindrical shape. However, as described above, sufficiently close contact between the outer tube portion 112b, the tapered opening 122b and the holding projection 111h can be obtained by employing the tapered outer tube portion 112b and the holding projection 111h.

Further, in the above-described embodiment, as an example of the outer tube portion of the sealing member, the outer tube portion 112b having the thickness dimension t11 larger than the gap d11 between the inner circumferential face 122b of the tapered opening 122b and the tapered face 111h-1 of the holding projection 111h is shown. However, the outer tube portion is not limited thereto, and the thickness dimension thereof may be any dimension. However, as described above, sufficiently close contact between the outer tube portion 112b, the tapered opening 122b and the holding projection 111h can be obtained by employing the outer tube portion 112b having the above-described large thickness dimension t11.

Further, in the above-described embodiment, as an example of the sealing member, the sealing member 112 that further includes the front sealing portion 112c for sealing the space between the front-side outer circumferential face 111b-1a of the housing 111b and the front-side inner circumferential face 122 a-1 of the through hole 122 is shown. However, the sealing member is not limited thereto, and it may include only the inner tube portion and the outer tube portion and may be accommodated only between the tapered opening and the connector body. However, as described above, the number of components can be reduced while providing waterproofness for a portion from the tapered opening 122b of the through hole 122 to the rear side thereof by employing the sealing member 112 including the front sealing portion 112c.

Further, in the above-described embodiment, as an example of the sealing member, the sealing member 112 including the outer circumferential lip rings 112d and the inner circumferential lip rings 112e formed on the front sealing portion 112c is shown. However, the sealing member is not limited thereto, and it may be configured such that the front sealing portion thereof may not include the outer circumferential lip rings and the inner circumferential lip rings, and the entire front sealing portion may be formed with a sufficient thickness for waterproofness. However, as described above, sufficiently close contact can be obtained while reducing the attachment friction of the housing 111b against the outer circumferential face of the housing 111b and the insertion friction of the housing 111b against the through hole 122 by employing the sealing member 112 including the above-described lip rings formed on the front sealing portion 112c.

LIST OF REFERENCE SIGNS 1 device with connector
110 waterproof connector 111 connector body
111a electric wire
111b housing
111b-1 outer circumferential face
111b front-side outer circumferential face
111b-2, 122b-1 inner circumferential face
111b-3 opening on outer side of device
111b-4 opening on inner side of device
111c inner sealing member
111d rear holder
111e front holder
111g flange portion
111h holding projection
111h-1 tapered face
112 sealing member
112a inner tube portion
112b outer tube portion
112c front sealing portion
112d outer circumferential lip ring
112e inner circumferential lip ring
120 device
121 outer wall
122 through hole
122a hole body
122a-1 front-side inner circumferential face
122b tapered opening
d11 gap
t11 thickness dimension
θ11, θ12, θ13 taper angle
D11 insertion direction

What is claimed is:

1. A waterproof connector comprising:
a connector body configured to be attached to a through hole by inserting a part of the connector body into the through hole, the through hole penetrating through an outer wall of a device and including a tapered opening, the tapered opening being an opening portion on an outer side of the device, an opening diameter of the opening portion being larger on the outer side of the device than on an inner side of the device such that the opening diameter decreases toward the inner side of the device; and
a sealing member having a ring shape and having a flexibility, the sealing member being configured to seal a space between an outer circumferential face of the connector body and an inner circumferential face of the tapered opening to provide waterproofness with respect to the through hole, wherein
the sealing member includes
a tube-shaped inner tube portion configured to closely contact with the outer circumferential face of the connector body, and
an outer tube portion which surrounds the inner tube portion in a circumferential direction on a rear side in an insertion direction in which the outer tube portion is inserted into the tapered opening, which has an opening diameter larger than the inner tube portion, and which is formed integral with the inner tube portion on a front side in the insertion direction,
the connector body includes a holding projection, and
the holding projection is configured to be inserted between the inner tube portion and the outer tube portion from the rear side in the insertion direction and is configured to push the outer tube portion against the inner circumferential face of the tapered opening when the sealing member is received between the outer circumferential face of the connector body and the inner circumferential face of the tapered opening, wherein
the outer tube portion has a tapered-tube shape extending in the insertion direction with a taper angle smaller than a taper angle of the tapered opening such that an opening diameter of the outer tube portion decreases in the insertion direction, and
the holding projection includes a face configured to face the inner circumferential face of the tapered opening with the outer tube portion sandwiched therebetween, the face being a tapered face extending in the insertion direction with a taper angle larger than the taper angle of the outer tube portion such that a diameter of the tapered face decreases in the insertion direction.

2. The waterproof connector according to claim 1, wherein
the connector body includes a flange portion disposed on the outer circumferential face of the connector body on the rear side in the insertion direction, the flange portion extending in a ring shape so as to cover an edge of the tapered opening, and
wherein the holding projection is formed integral with the flange portion so as to project in the insertion direction from the flange portion.

3. The waterproof connector according to claim 1, wherein
the outer tube portion is formed with a thickness dimension that is larger than a gap between the inner circumferential face of the tapered opening and a face of the holding projection that is configured to face the inner circumferential face of the tapered opening with the outer tube portion sandwiched therebetween.

4. The waterproof connector according to claim 1, wherein
the sealing member further includes a front sealing portion extending from a joint portion of the inner tube portion and the outer tube portion to a space between a front-side outer circumferential face of the connector body that is located on a front side in the insertion direction with respect to the tapered opening and a front-side inner circumferential face of the through hole that is located on the front side in the insertion direction with respect to the tapered opening, such that the front sealing portion seals the space therebetween.

5. The waterproof connector according to claim 4, wherein
an outer circumferential face of the front sealing portion of the sealing member is provided with an outer circumferential lip ring protruding toward the front-side inner circumferential face of the through hole, and
an inner circumferential face of the front sealing portion is provided with an inner circumferential lip ring protruding toward the outer circumferential face of the connector body.

6. A device with connector comprising:
a device including a through hole formed on an outer wall of the device, the through hole penetrating through the outer wall of the device and including a tapered opening, the tapered opening being an opening portion facing an outer side of the device that has an opening diameter larger on the outer side of the device than on an inner side of the device such that the opening diameter decreases toward the inner side of the device; and the waterproof connector according to claim 1, a part of which is inserted and attached to the through hole and which provides waterproofness with respect to the through hole.

\* \* \* \* \*